J. L. CREVELING.
ELECTRIC REGULATION.
APPLICATION FILED JUNE 21, 1911.
1,178,576.
Patented Apr. 11, 1916.
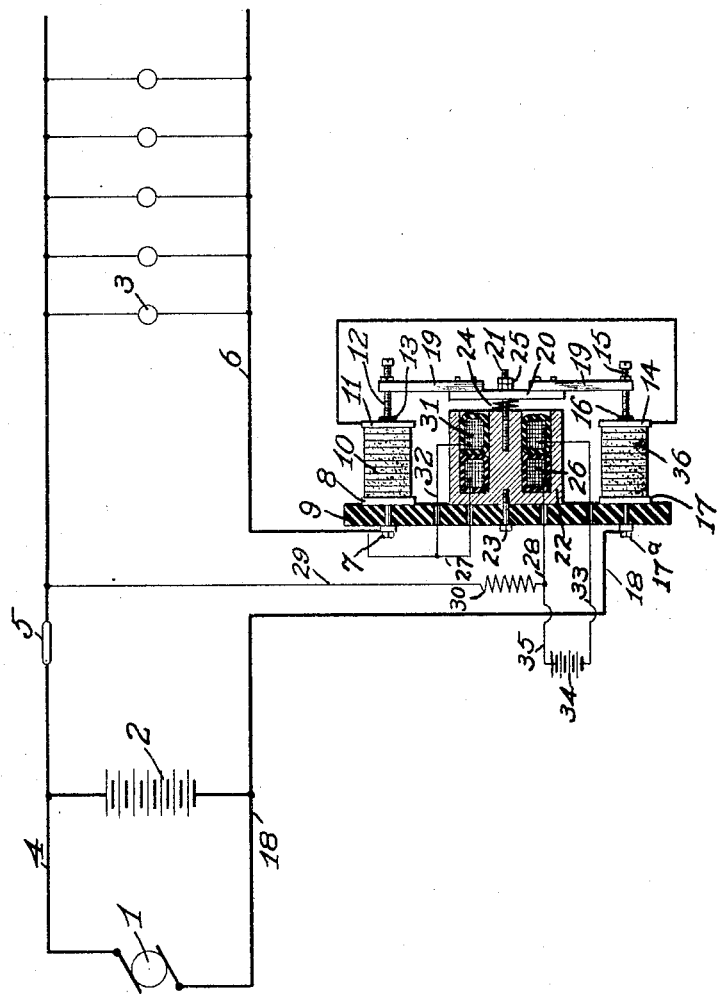

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,178,576.  Specification of Letters Patent.  Patented Apr. 11, 1916.

Application filed June 21, 1911. Serial No. 634,488.

*To all whom it may concern:*

Be it known that I, JOHN L. CREVELING, a resident of New York, in the county and State of New York, have invented certain new and useful Improvements in Electric Regulation, as set forth in the annexed specification and drawing forming a part thereof.

My invention pertains to that class of electric regulation wherein it is desired to automatically regulate an electric circuit in a predetermined manner as, for example, to hold the voltage thereon constant.

The drawing is a diagrammatic representation of one type of system embodying the essentials of my invention.

In the drawing, 1 represents a dynamo or generator which may be suitably controlled in any desired manner to charge the storage battery 2 and furnish current to the lamps or other translating devices indicated at 3. 4 is the positive lead of the generator in communication with the positive side of the storage battery 2 and the positive side of the lamps or other translating devices 3 which may be thrown in and out of circuit if desired as by the switch 5. The negative terminals of the lamps or translating devices 3 are connected with the main 6, and lead to the binding post 7, connected with the contact plate 8, carried by the insulating back member or base 9 and electrically connected with one end of the carbon pile resistance 10, the opposite end of which is in electrical communication with the contact member 11, carried by the adjustable screw 12 and insulated therefrom as by bushing 13. The contact member 11 is connected with a similar contact member 14, carried by the screw 15 and insulated therefrom as by bushing 16. The member 14 is in contact with one end of the carbon pile resistance 36, the opposite end of which is electrically connected with the contact member 17 in electrical communication, by binding post 17ª with the lead 18 which is carried to the negative side of the battery 2 and the negative brush of the generator. The screws 12 and 15 are carried by the arms 19 attached to the movable armature 20, carried upon the rod 21, supported by the magnet frame 22, secured to the base 9 as by screw 23. The spring 24 normally tends to move the armature 20 away from the frame 22 and decrease the pressure upon the carbon piles 10 and 36, while the limit of travel that the spring 24 may give the armature 20 may be determined by the nuts 25. 26 is a coil having one of its ends connected with the wire 6 as by wire 27 and its opposite end connected with the lead 4 near the switch 5, as by wires 28 and 29, through a suitable resistance 30.

31 is a coil wound to oppose the coil 26 and having one of its ends connected with the wire 27 as by wire 32, and the opposite end connected as by wire 33 with the proper terminal of a suitable source of counter-electromotive force, as indicated by a small storage battery at 34, the opposite terminal of which is connected as by wire 35 with the wire 29.

The operation of my invention is substantially as follows: If the generator be running and supplying current to the battery 2 and lamps or translating devices 3, current will flow from the generator 1, through lead 4, storage battery 2 and lead 18 to the generator; also through switch 5, translating devices 3, main 6, carbon pile 10, carbon pile 36 and lead 18 to the generator. Current will also flow through wire 29, resistance 30, wire 28, coil 26, wire 27 to the main 6, and this current, by energizing the coil 26, will cause the magnet 22 to attract the armature 20 against the action of spring 24 and compress the carbon piles 10 and 36 and thus reduce the resistance thereof and tend to increase the voltage upon the translation circuit. The counter-electro-motive force indicated as the small battery at 34, is so arranged that current tending to flow from the wire 29 and through the wire 35 will be opposed by the counter-electro-motive force of said battery, and I so adjust the dimensions of this counter-electro-motive force that when a desired predetermined voltage is reached across the mains 4 and 6 any increase above said voltage will overcome the counter-electro-motive force of the battery 34 and then current will flow from the wire 29 through wire 35, battery 34, wire 33, coil 31, wire 32 and wire 27 to the main 6, which current will set up a magneto-motive force in the coil 31 opposed to that in the coil 26 and thus weaken the action of the latter and lessen the pull of the magnet 22 upon the armature 20 and lessen the pressure of the screws 12 and 15 upon the carbon piles 10 and 36 and increase the resistance in the translation circuit in such manner as to tend to lower the voltage thereupon. If the electro-motive force of the battery 34 be maintained constant, and if the circuit containing the same be of low resistance, it will be obvious that the voltage upon the translation circuit may be held constant within a very narrow margin, because if the voltage across the translation circuit be slightly below the desired voltage determined by the counter-electro-motive force of the battery 34, said counter-electromotive force will cause a current to flow through coil 31 which will assist coil 26 in reducing the resistance in series with the translation circuit and on a very slight increase above the counter-electro-motive force of the battery 34 a considerable current will flow in a reverse direction and tend to weaken the effect of coil 26 and thus increase the resistance in the translation circuit and reduce the voltage thereupon, thus any departure from the desired voltage will be rectified within narrow limits.

I do not wish in any way to limit myself to the exact details of construction nor to the exact operation outlined in this specification to illustrate an embodiment of my invention, for it will be obvious that wide departure in the way of details may be made without departing from the spirit and scope of my invention, which is as set forth in the following claims.

I claim—

1. The combination of a generator; a circuit; a regulator in the circuit; a source of current connected with the generator; means connected to and adapted to be actuated by the generator for influencing the regulator; and means connected to and adapted to be actuated by the source of current for influencing the regulator, said two means being connected to oppose each other upon a predetermined rise in voltage across said circuit.

2. The combination of a generator; a circuit; a regulator in the circuit; a source of current connected in counter-relation with the generator; means controlled by the generator for influencing the regulator; and means connected to and adapted to be actuated by the source of current for influencing said regulator, said two means being connected to oppose each other upon a predetermined rise in voltage across said circuit.

3. The combination of a generator; a circuit; a regulator in said circuit; a coil connected with the generator for influencing the regulator; a second coil; and a second source of electro-motive force for influencing said regulator, and a circuit comprising said second source of electromotive force and said second coil connected in parallel with the first coil.

4. The combination of a generator; a circuit; a regulator in said circuit; a coil connected with the generator for influencing the regulator; a second coil; and a second source of electromotive force for also influencing the regulator, a circuit comprising said second coil and said second source of electromotive force connected in parallel with the first coil; and a resistance device connected in series with the parallel circuit comprising the first coil and the second coil and second source of electromotive force.

5. The combination of a generator; a circuit; and a regulator for the circuit embodying a variable resistance; means for varying said resistance; a plurality of coils arranged to act upon said resistance varying means, one adapted to be actuated by the generator; a second source of electrical energy connected with said coils and adapted to actuate the other coil; and a resistance connected with said coils.

6. An electric system comprising a supply circuit; a work circuit; a regulator between the supply and work circuits embodying a variable resistance; means for varying said resistance; a plurality of coils to act conjointly upon said resistance varying means; a source of electrical energy connected with said coils; a circuit connecting said coils and said source across the work circuit, and a resistance in series in said circuit.

7. The combination with a main circuit the voltage in which is to be maintained substantially constant, of a regulating shunt circuit including a plurality of coils in parallel, one of said coils connected so as to have its effect reversible, and a resistance device in series in the main circuit, and means influenced by the shunt circuit for varying the effects of said resistance.

8. The combination of a generator; a circuit; a regulator in said circuit; a source of current connected with the generator; means connected to and adapted to be actuated by the generator for influencing the regulator; and means connected to and adapted to be actuated by said source of current for influencing the regulator, said two means being connected to oppose each other upon a predetermined rise in voltage across the circuit, the said source of current and the means adapted to be actuated thereby being connected in parallel with the means adapted to be actuated by the generator.

9. The combination of a generator; a circuit; a regulator in the circuit; a source of current connected in counter-relation with the generator; means connected to and adapted to be controlled by the generator for influencing the regulator; and means connected to and adapted to be actuated by the source of current for influencing said regulator, said two means being connected to oppose each other upon a predetermined rise in voltage across said circuit, the source of current and the means adapted to be actuated thereby being connected in parallel with the means adapted to be actuated by the generator.

JOHN L. CREVELING.

Witnesses:
CHAS. McC. CHAPMAN,
ANNA MARIE WALL.

Copies of this patent may be obtained for five cents each, by addressing the "Commissioner of Patents, Washington, D. C."